July 27, 1965 A. H. ANSON 3,197,573

TELEPHONE SUPPLEMENTARY DIAL ATTACHMENT

Filed July 7, 1964

INVENTOR
ARTHUR H. ANSON
BY [signature]
ATTORNEY.

United States Patent Office 3,197,573
Patented July 27, 1965

3,197,573
TELEPHONE SUPPLEMENTARY DIAL ATTACHMENT

Arthur H. Anson, 805 N. 26th St., Allentown, Pa.
Filed July 7, 1964, Ser. No. 380,800
5 Claims. (Cl. 179—90)

This invention relates generally to a telephone attachment and more particularly to an improved design and construction of a supplementary indicia disc adapted for attachment to the conventional dialing ring of dial telephones.

Among the principal objects of the present invention is to provide a dial disc which may be readily mounted in position upon the conventional built-in dial dialing ring and which is provided with complementary dialing indicia of substantially increased size and legibility to render more facile the dialing operation, particularly for those individuals who find it difficult to observe and locate the desired call letters and numerals.

A further object of the present invention is to provide a supplementary dialing disc which is extremely simple and inexpensive to manufacture and which may be easily and quickly detachably secured in position without the necessity of employing any special tools.

Other objects and advantages of the present invention will be apparent more fully from the specification which follows, it being understood that the invention consists in the combination, construction, location and relative arrangement of parts as described in detail hereinafter, as shown in the accompanying drawing and as finally pointed out in the appended claims.

In the drawing, which illustrates a preferred embodiment of the invention:

Figures 1, 2, 3, 4, 5, 6, 7:
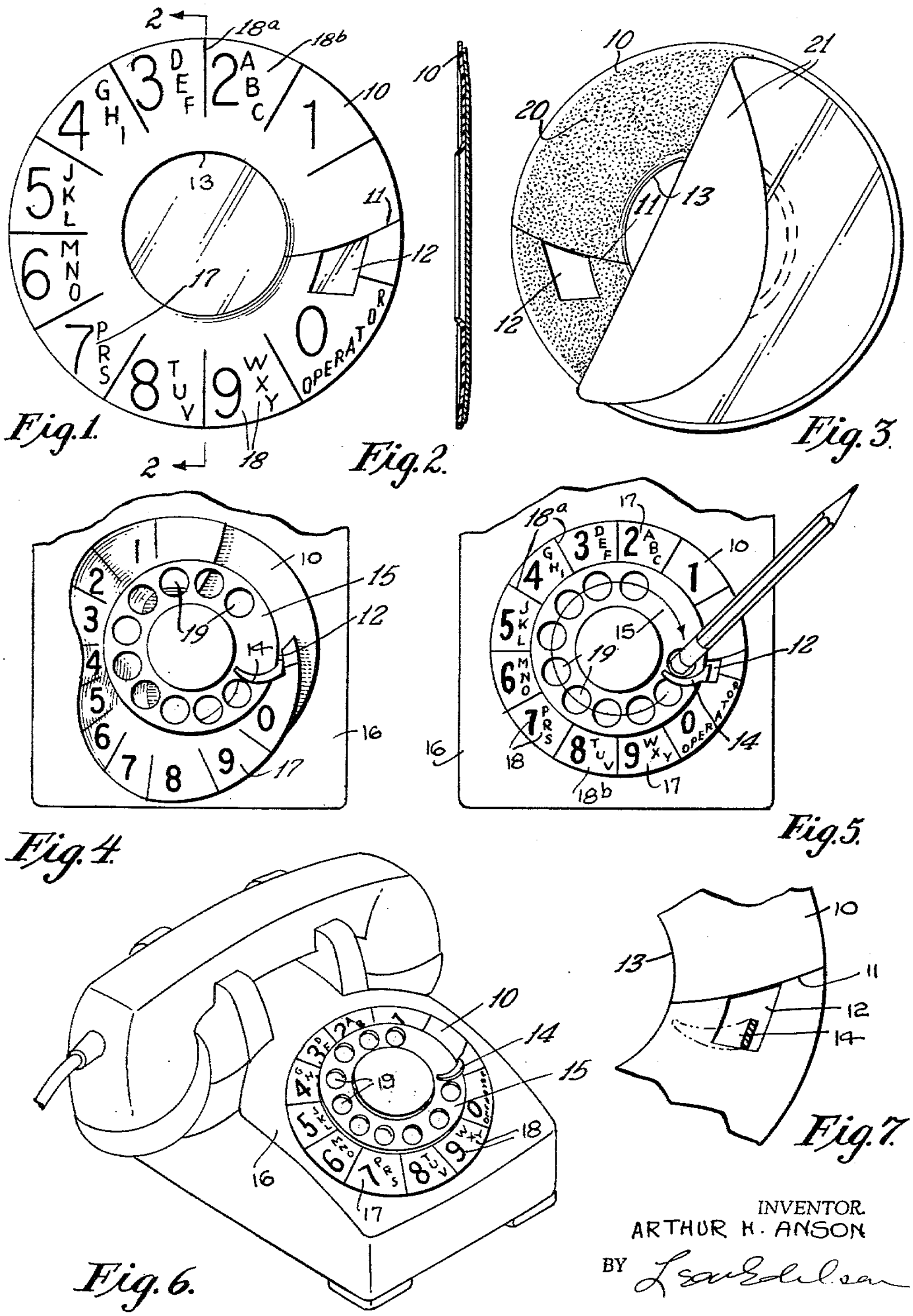
FIGURE 1 is a plan view of the obverse or top face of the supplementary dialing disc.
FIGURE 2 is a diametric sectional view of the disc as taken on the line 2—2 of FIGURE 1.
FIGURE 3 is a view showing the reverse or bottom face of the disc with its adhesive-protective covering shown partially peeled away.
FIGURE 4 is a view illustrating a step in the operation of mounting the supplementary disc in position.
FIGURE 5 is a view showing the dial in its final position and illustrating the operation of pressing the adhesively-coated bottom face of the disc into adhering contact with the surface of the telephone upon which it is supported.
FIGURE 6 is a perspective view of a conventional dial telephone showing operatively mounted thereon the supplementary dialing disc of the present invention.
FIGURE 7 is an enlarged fragmentary view of that split portion of the dialing disc through which the stop hook of the dial telephone projects, the portion of the hook which overlies the disc being shown in phantom.

Referring now to FIGURES 1 to 3 of the drawing, it will be observed that the dialing disc 10 of the present invention is essentially in the form of a flat annulus which is die cut out of any suitable relatively stiff sheet material such as card-board, plastic, metal or the like having a sufficient degree of flexibility to enable it to be bent somewhat out of its normal flat plane during the operation of mounting the disc in position. The disc is split along a line 11 which preferably extends at an acute angle to the true radial line of the disc, with one end portion of the split disc being notched out, as at 12, to provide an opening in the disc which is radially offset from its central aperture 13 to permit the projection therethrough of the telephone dial stop hook 14.

The disc 10 is of substantially greater diameter than the rotatable dial ring 15 of the conventional telephone, so that when the disc 10 is mounted in position upon the telephone base 16 in underlying relation to the dial ring 15, a substantial portion of the disc 10 projects radially outwardly of the circumferential edge of the telephone dial ring and so provides a circular indicia band 17 which is fully exposed to view. Preferably, the central aperture of the disc 10 is of such diameter that its circumferential edge snugly embraces the hub (not shown) of the telephone dial ring and so insures that the disc 10 and the telephone dialing ring 15 are in coaxial registry.

Stamped, printed or otherwise applied to the exposed marginal band portion 17 of the annulus 10 are enlarged dialing indicia 18 which in character and location correspond to the indicia normally visible through the finger holes 19 of the telephone dialing ring 15. However, since the dialing indicia 18 are located in the band portion 17 which concentrically encircles the conventional dialing ring 15, the same may be of considerably enlarged size and thus rendered far more visible than the conventional indicia which are of necessity so reduced in size as to be visible through the finger holes 19 of the dialing ring. Preferably, in order to demarcate the several groups of dialing letters and numerals, each group is delineated by radially extending lines 18*a* to provide clearly defined areas 18*b* respectively corresponding to the circular areas defined by the dialing ring finger holes 19, as is most clearly shown in FIGURE 6. If desired, in order to further increase the visibility of the dialing indicia 18 and to facilitate use of the phone in the dark, the indicia may be stamped or printed with luminous paint or the like.

In order to secure the disc 10 in fixed operative position upon the telephone base beneath the rotatable dialing ring 15, the reverse or bottom face of the supplementary disc 10 is provided with a pressure-sensitive adhesive backing 20 which is preferably covered by a removable ply of protective paper 21 or the like.

When it is desired to mount the supplementary dialing disc of the present invention in position, the protective covering 21 is first removed, as see FIGURE 3, and then the notched end of the split annulus, with its adhesive backing face down, is inserted between the telephone base and the dialing ring 15 until the inner edge of the notch 12 engages the finger stop hook 14, care being taken, however, to keep the adhesive backing out of contact with the telephone base. Thereafter, the annulus is worked clockwise from its notched end into position beneath the dialing ring 15 until finally its un-notched split end is brought into substantial abutment with the notched end, thereby closing the annulus snugly about the hub (not shown) of the dialing ring 15.

The flexibility of the disc 10 permits of its deformation out of its normal flat plane (as see FIGURE 4) sufficiently to flex the disc into full embracement about the hub of the dialing ring to locate the annulus immediately beneath the dialing ring with the indicia band of the supplementary disc fully exposed.

With the disc 10 thus disposed beneath the dialing ring 15, it may be fixedly secured in position by pressing its pressure-sensitive adhesive surface firmly against the telephone base. By inserting the end of a pencil or the like into the dialing ring opening for the numeral "0" and then rotating it clockwise while pressing downwardly against the disc, the portion of the latter disposed immediately beneath the dialing ring also may be pressed firmly and securely into adhering contact with the underlying surface of the telephone base. In its finally secured position, the supplementary dialing disc of the present invention will appear as shown in FIGURE 6 with all of its dialing indicia exposed to view externally of the central rotatable dialing ring 15.

It will be understood, of course, that the present invention is susceptible of various changes and modifications which may be made from time to time without departing from the general principles or real spirit of the invention, and it is accordingly intended to claim the same broadly as well as specifically as indicated by the appended claims.

What is claimed as new and useful is:

1. A supplementary telephone call indicia device for use with dial telephones of the type having a base surmounted by a rotatable dialing ring provided with an annular row of finger openings by means of which said ring may be rotated relatively to a fixed stop carried by said base, said device being in the form of a flat annulus of an outside diameter substantially greater and an inside diameter substantially less than the diameter of the telephone dialing ring, said annulus being split to provide a pair of separable ends one of which is notched to form an opening in the annulus for projection therethrough of said fixed stop carried by the base of the telephone, said annulus being adapted for disposition between the telephone base and the rotatable dialing ring in axial registry with the latter whereby a substantial surface of the annulus is exposed externally of the dialing ring in concentric relation thereto, said exposed surface of the annulus having spaced circumferentially thereabout dialing indicia corresponding in character and circumferential spacing but of substantially larger size than that of the conventional indicia normally disposed beneath the telephone dialing ring.

2. A device of the character defined in claim 1 wherein said opening formed by the notched end of the annulus is disposed between the inner and outer circular edges of the annulus.

3. A device of the character defined in claim 1 wherein the split annulus is fitted more or less snugly about the central hub of the telephone dialing ring with the separable ends thereof in coplanar relation.

4. A device of the character defined in claim 1 wherein the face of said annulus abutting the telephone base is provided with a coating of pressure sensitive adhesive for fixedly adhering the annulus in operative position upon the telephone base.

5. A device of the character defined in claim 4 wherein the split annulus is fitted more or less snugly about the central hub of the telephone dialing ring with the separable ends thereof in coplanar relation, said coating of pressure sensitive adhesive being covered by a removable ply of protective sheet material which is strippable from the annulus preliminary to mounting the same in position as aforesaid.

No references cited.

ROBERT H. ROSE, *Primary Examiner.*